(12) United States Patent
Sekine et al.

(10) Patent No.: US 10,303,138 B2
(45) Date of Patent: May 28, 2019

(54) EQUIPMENT CONTROL SYSTEM, IMAGE FORMING DEVICE, AND NON-TRANSITORY COMPUTER READABLE STORAGE MEDIUM

(71) Applicant: FUJI XEROX CO., LTD., Tokyo (JP)

(72) Inventors: Yoshihiro Sekine, Kanagawa (JP); Chigusa Nakata, Kanagawa (JP); Hiroshi Honda, Kanagawa (JP); Eiji Nishi, Kanagawa (JP); Kenji Kuroishi, Kanagawa (JP); Hiroshi Mikuriya, Kanagawa (JP); Takeshi Furuya, Kanagawa (JP); Ryuichi Ishizuka, Kanagawa (JP); Keita Sakakura, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 86 days.

(21) Appl. No.: 15/486,664

(22) Filed: Apr. 13, 2017

(65) Prior Publication Data
US 2018/0181092 A1 Jun. 28, 2018

(30) Foreign Application Priority Data
Dec. 22, 2016 (JP) ................... 2016-250103

(51) Int. Cl.
G05B 15/02 (2006.01)
H04L 12/28 (2006.01)
H04N 1/00 (2006.01)

(52) U.S. Cl.
CPC ............ *G05B 15/02* (2013.01); *H04L 12/283* (2013.01); *H04L 12/2814* (2013.01); *H04N 1/00244* (2013.01); *H04N 1/00891* (2013.01); *G05B 2219/2642* (2013.01); *H04L 2012/285* (2013.01); *H04N 2201/0013* (2013.01); *H04N 2201/0094* (2013.01)

(58) Field of Classification Search
CPC ............ G05B 15/02; G05B 2219/2642; H04L 12/2814; H04L 12/283; H04L 2012/285; H04N 1/00244; H04N 1/00891; H04N 2201/0013; H04N 2201/0094
See application file for complete search history.

(56) References Cited

U.S. PATENT DOCUMENTS

| | | | |
|---|---|---|---|
| 2012/0096120 A1* | 4/2012 | Couillabin | H04L 12/2818 709/218 |
| 2013/0211611 A1* | 8/2013 | Ahrensbach | F03D 7/047 700/287 |
| 2016/0299497 A1* | 10/2016 | McLaughlin | G05B 19/4185 |

FOREIGN PATENT DOCUMENTS

| | | |
|---|---|---|
| EP | 2838066 A1 | 2/2015 |
| JP | 2012-521728 A | 9/2012 |
| JP | 2015-505404 A | 2/2015 |
| WO | 2010/111148 A2 | 9/2010 |

(Continued)

*Primary Examiner* — Yuhui R Pan
(74) *Attorney, Agent, or Firm* — Oliff PLC (57) ABSTRACT

An equipment control system includes
an equipment control device that controls equipment provided in an office room, and
an external control device that is provided outside the office room and controls the equipment provided in the office room via the equipment control device, wherein
when a predetermined condition is satisfied, a control device that controls the equipment is switched from one of the equipment control device and the external control device to the other.

12 Claims, 9 Drawing Sheets

(56) References Cited

FOREIGN PATENT DOCUMENTS

WO     2013/101563 A1   7/2013
WO     WO2013/145951 A1  10/2013

\* cited by examiner

EQUIPMENT CONTROL SYSTEM, IMAGE FORMING DEVICE, AND NON-TRANSITORY COMPUTER READABLE STORAGE MEDIUM

CROSS-REFERENCE TO RELATED APPLICATIONS

This application is based on and claims priority under 35 USC 119 from Japanese Patent Application No. 2016-250103 filed Dec. 22, 2016.

BACKGROUND

Technical Field

The present invention relates to an equipment control system, an image forming device, and a non-transitory computer readable storage medium.

SUMMARY

According to an aspect of the invention, an equipment control system includes an equipment control device that controls equipment provided in an office room, and an external control device that is provided outside the office room and controls the equipment provided in the office room via the equipment control device, wherein when a predetermined condition is satisfied, a control device that controls the equipment is switched from one of the equipment control device and the external control device to the other.

BRIEF DESCRIPTION OF THE DRAWINGS

Exemplary embodiments of the present invention will be described in detail based on the following figures, wherein.

DETAILED DESCRIPTION

Hereinafter, exemplary embodiments of the present invention will be described in detail with reference to the accompanying drawings.

Figure 1:
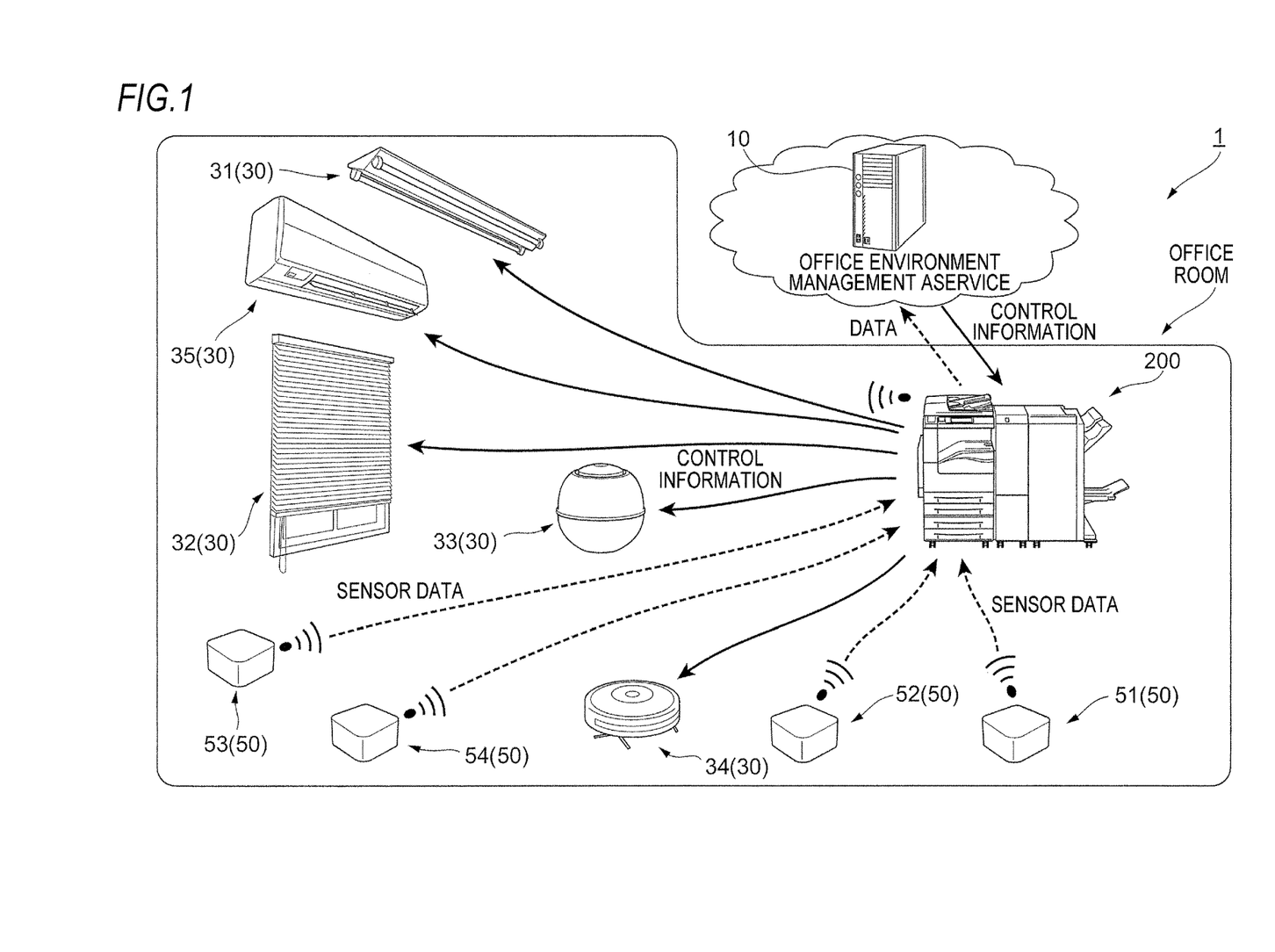
FIG. 1 is a view illustrating an entire configuration of an office environment management system.

FIG. 1 is a view illustrating an entire configuration of an office environment management system 1.

In the office environment management system 1, a management server 10 as an example of an external control device provided on a cloud and an image forming device 200 which is connected to the management server 10 to serve as a gateway or an edge computer are provided. Further, the image forming device 200 may have a facsimile function or a scanner function in addition to an image forming function.

Here, the image forming device 200 is provided in an office room (or in an office) where a user works. In the meantime, the management server 10 is provided outside the office room.

In the office environment management system 1, a device 30 to be controlled which is an example of equipment controlled by the image forming device 200 or the management server 10 is provided. Further, in the office environment management system 1, plural sensors 50 are provided in the office room.

Plural devices 30 to be controlled are provided in the office room. Further, each of the devices 30 to be controlled is connected to the image forming device 200 as an example of the equipment control device. Further, each of the devices 30 to be controlled is connected to the management server 10 via the image forming device 200.

Here, the office environment management system 1 according to the exemplary embodiment may be understood as an equipment control system which controls the device 30 to be controlled which is an example of the equipment.

The device 30 to be controlled communicates with the image forming device 200 and receives control information from the image forming device 200 or the management server 10. In the exemplary embodiment, as the devices 30 to be controlled, a lighting device 31, a window shade device 32, a humidifier 33, a cleaning device 34, and an air conditioner 35 are provided.

In the exemplary embodiment, as will be described below, some devices 30 to be controlled among the plural devices 30 to be controlled are controlled by the image forming device 200 and other devices 30 to be controlled among the plural devices 30 to be controlled are controlled by the management server 10.

In the exemplary embodiment, plural sensors 50 are provided in the office room. Specifically, in the exemplary embodiment, a temperature sensor 51 that measures a temperature, a humidity sensor 52 that measures humidity, and an illuminance sensor 53 that measures illuminance are provided. Further, a person sensor 54 that is configured with an infrared sensor and detects a person in the office room is provided.

Here, each sensor 50 transmits obtained information to the image forming device 200, using wireless communication or wired communication (by communicating with the image forming device 200). Further, the image forming device 200 transmits information from the sensor 50 to the management server 10.

The lighting device 31 has a light source and turns on or off the light source in accordance with the received control information. In the exemplary embodiment, the lighting device 31 is controlled by the image forming device 200. The image forming device 200 outputs a control signal to the lighting device 31 based on a detection result of the illuminance sensor 53 or the person sensor 54 and turns on or off the light source.

A window shade device 32 has window shades and a diving mechanism which changes a status of the window shades, and changes the state of the window shades in accordance with the control information. Accordingly, an amount of external light which enters the office room is changed.

The window shade device 32 is controlled by the management server 10. The management server 10 obtains information such as weather outside the office room, a sunrise time, and a sun set time through an internet line. Further, the management server 10 obtains a detection result by the temperature sensor 51, the humidity sensor 52, and the illuminance sensor 53 provided in the office room. The management server 10 changes the state of the window shades based on the above-mentioned information.

The humidifier 33 has a mechanism for evaporating water and performs humidification in the office room in accordance with the control information. The humidifier 33 is controlled by the image forming device 200. The image forming device 200 outputs the control signal to the humidifier 33 based on the detection result of the temperature sensor 51 and the humidity sensor 52 to humidify the office room.

The cleaning device 34 has a suction mechanism which sucks trash in the office room and moves in the office room in accordance with the control information to collect the trash in the office room. The cleaning device 34 is controlled by the image forming device 200. The image forming device 200 outputs the control signal to the cleaning device 34 at every predetermined timing to collect the trash in the office room.

The air conditioner 35 has a heating source and adjusts air conditioning in the office room in accordance with the control information. The air conditioner 35 is controlled by the image forming device 200. The image forming device 200 outputs the control signal to the air conditioner 35 based on the detection result of the temperature sensor 51 and the humidity sensor 52 to control the air conditioning in the office room.

In the exemplary embodiment, even though it is described that the image forming device 200 or the management server 10 performs the control for every device 30 to be controlled, some functions of the device 30 to be controlled may be controlled by the image forming device 200 and the other functions may be controlled by the management server 10.

Figure 2:
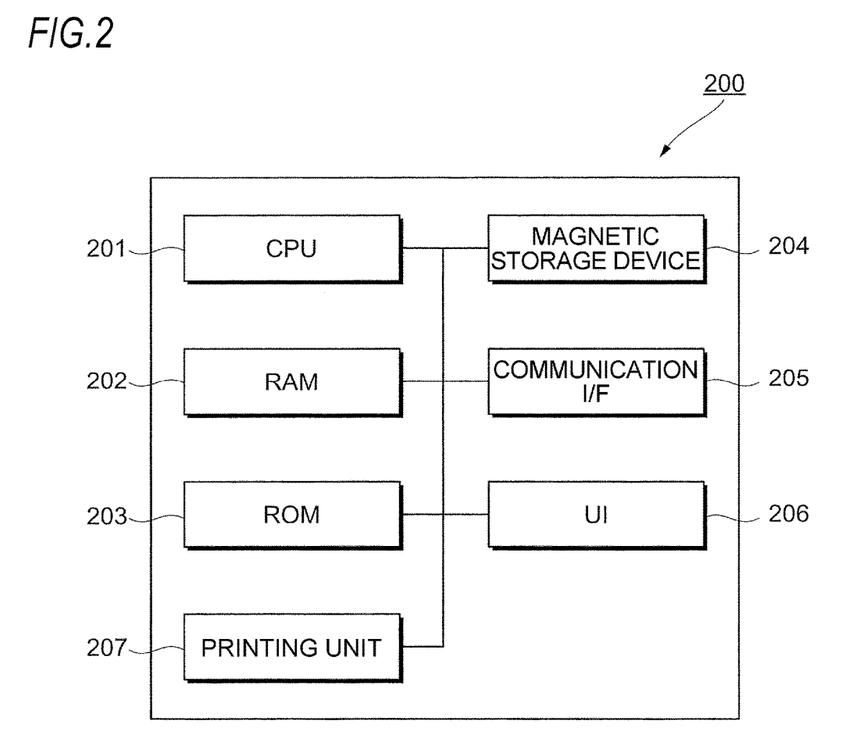
FIG. 2 is a view illustrating a hardware configuration of an image forming device.

FIG. 2 is a view illustrating a hardware configuration of the image forming device 200.

As illustrated in FIG. 2, the image forming device 200 includes a central processing unit (CPU) 201, a random access memory (RAM) 202, a read only memory (ROM) 203, and a magnetic storage device 204. The image forming device 200 further includes a communication interface (communication I/F) 205 to perform communication with the outside.

The image forming device 200 further includes an UI 206 and a printing unit 207.

The UI 206 is, for example, configured with a touch panel type display, displays information to the user and accepts manipulation from the user.

The printing unit 207 as an example of the image forming unit performs print processing (an image forming processing) onto a sheet as an example of a recording medium using an electrophotographic system or an inkjet head system.

The ROM 203 and the magnetic storage device 204 store programs executed by the CPU 201. The CPU 201 reads out the program stored in the ROM 203 or the magnetic storage device 204 and executes the program with the RAM 202 as a working area.

Each functional unit which will be described below is implemented by executing the program stored in the ROM 203 or the magnetic storage device 204 by the CPU 201.

Here, the program which is executed by the CPU 201 may be stored in a computer readable recording medium such as a magnetic recording medium (a magnetic tape or a magnetic disk), an optical recording medium (an optical disc), a magnetooptic recording medium, or a semiconductor memory to be provided to the image forming device 200. Further, the program which is executed by the CPU 201 may be downloaded to the image forming device 200 using a communication unit such as the Internet.

Figure 3:
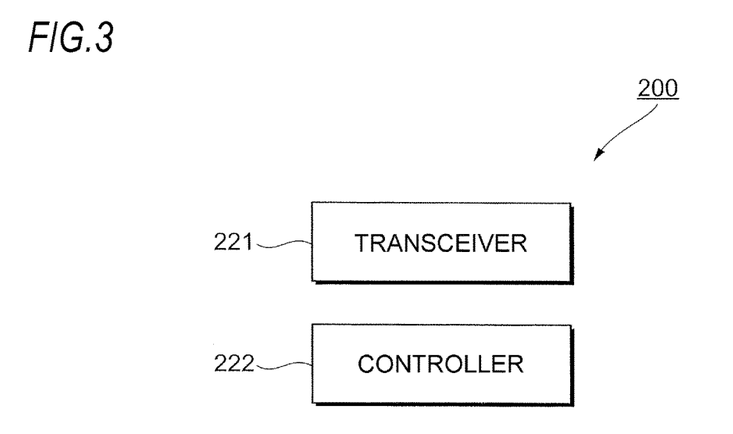
FIG. 3 is a view illustrating each functional unit implemented by a CPU and the like of the image forming device.

FIG. 3 is a view illustrating each functional unit implemented by the CPU 201 and the like of the image forming device 200. Further, in FIG. 3, a functional unit related to the control of the device 30 to be controlled is illustrated.

In the image forming device 200 according to the exemplary embodiment, as illustrated in FIG. 3, a transceiver 221 is provided. The transceiver 221 is implemented by the CPU 201 that executes a program related to the reception/transmission of information and the communication I/F 205.

The transceiver 221 as an example of a transceiving unit receives the control information from the management server 10 and transmits the control information to the device 30 to be controlled. The transceiver 221 transmits control information output from a controller 222 which will be described later, to the device 30 to be controlled.

The transceiver 221 transmits the information from the device 30 to be controlled to the management server 10. Further, the transceiver 221 transmits the information from the sensor 50 to the management server 10.

The transceiver 221 receives information such as a printing job, from the computer device (not illustrated) and outputs the information to the printing unit 207 (see FIG. 2).

The image forming device 200 includes a controller 222 as an example of a controller.

The controller 222 is implemented by the CPU 201 which executes a program related to the control of the device 30 to be controlled. The controller 222 controls the device 30 to be controlled provided in the office room. More specifically, the controller 222 outputs control information which is used to control the device 30 to be controlled. The control information is transmitted by the transceiver 221 to the device 30 to be controlled, and the device 30 to be controlled is controlled accordingly.

Figure 4:
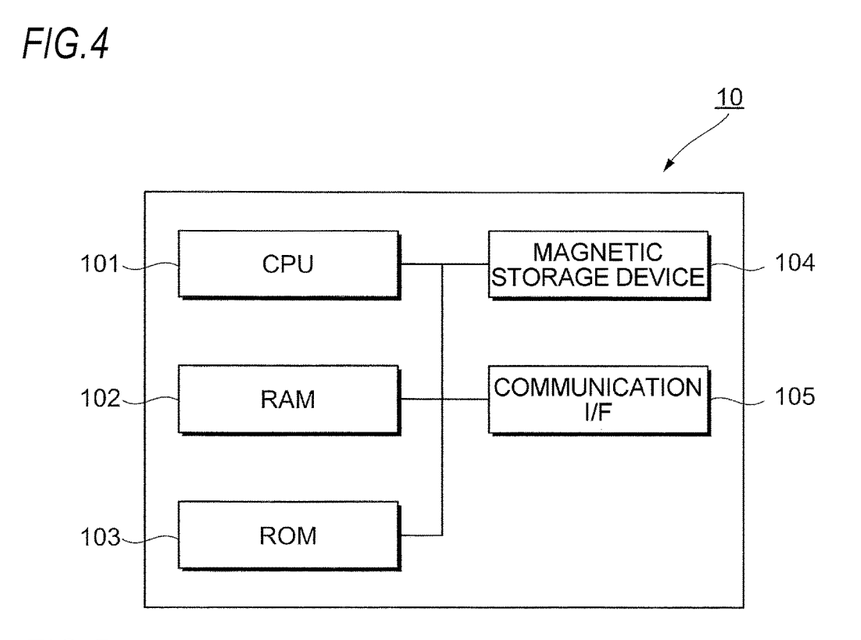
FIG. 4 is a view illustrating a configuration of hardware of a management server.

FIG. 4 is a view illustrating a configuration of hardware of the management server 10.

As illustrated in FIG. 4, the management server 10 includes a central processing unit (CPU) 101, a random access memory (RAM) 102, a read only memory (ROM) 103, and a magnetic storage device 104. The management server 10 further includes a communication interface (communication I/F) 105 to perform communication with the outside.

The ROM 103 and the magnetic storage device 104 store programs executed by the CPU 101. The CPU 101 reads out the program stored in the ROM 103 or the magnetic storage device 104 and executes the program with the RAM 102 as a working area.

Each functional unit which will be described below is implemented by executing the program stored in the ROM 103 or the magnetic storage device 104 by the CPU 101.

Here, the program which is executed by the CPU 101 may be stored in a computer readable recording medium such as a magnetic recording medium (a magnetic tape or a magnetic disk), an optical recording medium (an optical disc), a magnetooptic recording medium, or a semiconductor memory to be provided to the management server 10.

The program which is executed by the CPU 101 may be downloaded to the management server 10 using a communication unit such as the Internet.

Figure 5:
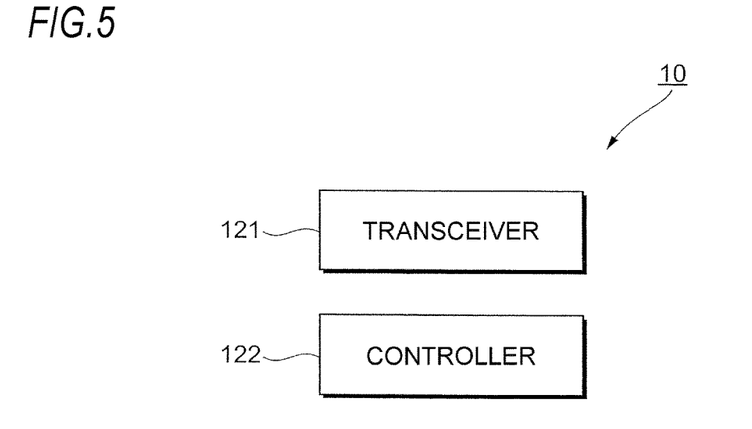
FIG. 5 is a view illustrating each functional unit implemented by a CPU and the like of the management server.

FIG. 5 is a view illustrating each functional unit implemented by the CPU 101 and the like of the management server 10. Further, in FIG. 5, a functional unit related to the control of the device 30 to be controlled is illustrated.

As illustrated in FIG. 5, in the management server 10, a transceiver 121 is provided. The transceiver 121 is implemented by the CPU 101 that executes a program related to the reception/transmission of information and a communication I/F 105.

The transceiver 121 transmits control information (control information output by the controller 122 which will be described below) which controls the device 30 to be controlled to the device 30 to be controlled via the image forming device 200.

In other words, in the exemplary embodiment, the management server 10 is configured to control the device 30 to be controlled via the image forming device 200. When the control information is output from the management server 10, the control information is transmitted to the device 30 to be controlled via the image forming device 200.

The transceiver 121 receives information transmitted from the image forming device 200. Specifically, the transceiver 121 receives information which is output from the device 30 to be controlled or the sensor 50 and transmitted via the image forming device 200.

The management server 10 includes the controller 122.

The controller 122 is implemented by the CPU 101 which executes a program related to the control of the device 30 to be controlled. The controller 122 controls the device 30 to be controlled provided in the office room. More specifically, the controller 122 outputs control information which is used to control the device 30 to be controlled. The control information is transmitted to the image forming device 200 by the transceiver 121 and is transmitted to the device 30 to be controlled by the image forming device 200.

Here, in the exemplary embodiment, the control of the device 30 to be controlled is performed. However, when the device 30 to be controlled is controlled by only one of the image forming device 200 and the management server 10, a situation in which it becomes difficult to control the device 30 to be controlled may arise.

Specifically, for example, it is also assumed that the image forming device 200 or the management server 10 stops due to maintenance or disaster. In this case, if the control is performed only by one of the devices, the device 30 to be controlled may not be controlled.

For example, when the device 30 to be controlled is controlled only by the management server 10, a communication load between the image forming device 200 and the management server 10 is increased. Further, when the device 30 to be controlled is controlled only by the management server 10, the processing may be delayed.

If the device 30 to be controlled is controlled only by the management server 10, a situation in which the device 30 to be controlled cannot be controlled due to failure of a communication line may occur.

Here, as a countermeasure for the failure of the communication line, it is considered to provide a secondary server or a dedicated line. However, even in this case, the failure may not be completely prevented and high cost may be incurred.

In the meantime, when the device 30 to be controlled is controlled by the image forming device 200, the above-mentioned problems hardly occur. However, when the image forming device 200 performs the control, it is difficult to review an operating algorithm of the device 30 to be controlled.

In contrast, in many cases, the management server 10 has a processing ability in comparison with the image forming device 200. Further, when the processing is performed by the management server 10, rather than the image forming device 200, it is easy to review the operating algorithm.

Specifically, when a new device 30 to be controlled is added or the device 30 to be controlled is exchanged, in order to make the operation of the device 30 to be controlled suitable for the added or exchanged device 30 to be controlled, it is desirable to perform the review processing on the operating algorithm.

However, when the review processing is performed by the image forming device 200, a processing load of the image forming device 200 is increased. Further, it is not reasonable that a program for the review processing of the operating algorithm is stored in individual image forming devices 200 to perform the review processing of the operating algorithm.

Based on the above-described situation, in the exemplary embodiment, the device 30 to be controlled is not controlled by only one of the management server 10 and the image forming device 200, but devices which control the device 30 to be controlled are switched depending on the situation.

More specifically, in the exemplary embodiment, when a predetermined condition is satisfied, the devices which control the device 30 to be controlled are switched from one of the image forming device 200 and the management server 10 to the other.

In other words, in the exemplary embodiment, when the predetermined condition is satisfied, instead of the management server 10, the image forming device 200 transmits the control information (control information generated by the controller 222) to the device 30 to be controlled to control the device 30 to be controlled.

In the exemplary embodiment, when the predetermined condition is satisfied, instead of the image forming device 200, the management server 10 transmits the control information (control information generated by the controller 122) to the device 30 to be controlled to control the device 30 to be controlled.

The switching of devices which control the device 30 to be controlled will be described in detail.

First, descriptions will be made on a case where the device which controls the device 30 to be controlled is switched from the management server 10 to the image forming device 200.

The switching from the management server 10 to the image forming device 200 is performed in a case where the communication between the image forming device 200 and the management server 10 is not possible, for example, when communication with the management server 10 is not present within a predetermined time or a network failure occurs.

The switching from the management server 10 to the image forming device 200 is performed in a case where a communication state between the management server 10 and the image forming device 200 is a predetermined communication state, for example, when a delay occurs due to a large network load. In other words, the switching is performed when the communication between the management server 10 and the image forming device 200 is not in a good shape.

Even though the communication between the management server 10 and the image forming device 200 is good, for example, it may be configured such that the management server 10 is automatically switched to the image forming device 200 at a time when the control by the management server 10 becomes undesirable during the day or night. In other words, even though the communication between the management server 10 and the image forming device 200 is good, the management server 10 may be switched to the image forming device 200 at a predetermined time.

The image forming device 200 may be switched to the management server 10 at a predetermined time.

The switching from the management server 10 to the image forming device 200 is performed when the device 30 to be controlled cannot be controlled by the management server 10, for example, when the management server 10 stops.

Therefore, the device 30 to be controlled is controlled by the image forming device 200 and the control of the device 30 to be controlled is continuously performed.

The control of the device 30 to be controlled by the image forming device 200 is performed by the controller 222 (see FIG. 3) of the image forming device 200.

In the exemplary embodiment, a program used for the control of the device 30 to be controlled is stored in advance in the image forming device 200. More specifically, in the exemplary embodiment, a program used for the control of the device 30 to be controlled is output from the management server 10 to the device 30 to be controlled and the program is stored in the image forming device 200. The image forming device 200 controls the device 30 to be controlled using the program.

The switching from the management server 10 to the image forming device 200 is performed, for example, when a disaster mode is set in the image forming device 200.

Specifically, when a user inputs the disaster mode as an operating mode of the image forming device 200 through the UI 206 (see FIG. 2), the management server 10 is switched to the image forming device 200. In other words, when there is a predetermined input from the user to the image forming device 200, the management server 10 is switched to the image forming device 200. Therefore, the control of the device 30 to be controlled by the image forming device 200 starts.

When a disaster occurs, the load of the communication line is drastically increased and the control by the management server 10 may become difficult.

As described in the exemplary embodiment, a device which controls the device 30 to be controlled is switched from the management server 10 to the image forming device 200 (when the control is switched to the control in the local), even when the disaster occurs, there is a high possibility that the device 30 to be controlled is continuously controlled.

The switching from the management server 10 to the image forming device 200 is performed when a state in which the image forming device 200 loses the control of the device 30 to be controlled is changed to a state in which the image forming device 200 can control the device 30 to be controlled.

Specifically, the switching is performed when the state in which a program for controlling the device 30 to be controlled is not stored in the image forming device 200 is changed to a state in which the program is stored in the image forming device 200.

For example, when a power of the image forming device 200 which has been turned off is turned on or a power of the image forming device 200 in a power saving state is recovered, the switching from the management server 10 to the image forming device 200 is performed.

The switching from the management server 10 to the image forming device 200 is performed, for example, when the operating algorithm (a control method) of the device 30 to be controlled is determined in the management server 10, a program for controlling the operating algorithm is generated in the management server 10, and the program is transmitted to the image forming device 200 and stored in the image forming device 200.

As described above, the operating algorithm of the device 30 to be controlled is determined in the management server 10 in some cases. In this case, the program for implementing the control in the operating algorithm is generated in the management server 10.

The switching from the management server 10 to the image forming device 200 is performed when the program is stored in the image forming device 200 and the control using the program is available.

Next, switching from the image forming device 200 to the management server 10 will be described.

The switching from the image forming device 200 to the management server 10 is performed, for example, when a new device 30 to be controlled is provided or the device 30 to be controlled is exchanged with a new device 30 to be controlled.

When the new device 30 to be controlled is provided or the device 30 to be controlled is exchanged with a new device 30 to be controlled, a program for controlling the device 30 to be controlled may not have been stored in the image forming device 200 yet. In the meantime, an information storage capacity of the management server 10 is large so that the management server 10 may store a program for controlling various devices 30 to be controlled.

When the new device 30 to be controlled is provided or the device 30 to be controlled is exchanged with a new device 30 to be controlled, there is a high possibility in that it becomes possible to control the device 30 to be controlled by switching from the image forming device 200 to the management server 10.

When the new device 30 to be controlled is provided or the device 30 to be controlled is exchanged with a new device 30 to be controlled, if the image forming device 200 is switched to the management server 10, a program to which an operating algorithm more suitable for the control of the new device 30 to be controlled is reflected may be generated.

The device 30 to be controlled is provided in various situations and the operation of the device 30 to be controlled is not uniformly performed, but may be performed by an operating algorithm in accordance with an installation environment.

The device is switched from the image forming device 200 to the management server 10 so that a program is generated by the management server 10 having a more processing capability than that of the image forming device 200 and a program to which an operating algorithm more suitable for the control of the device 30 to be controlled is reflected may be more quickly generated. Further, the management server 10 generates the program while controlling the device 30 to be controlled.

When the program is generated by the management server 10, thereafter, the management server 10 controls the device 30 to be controlled using the program. Therefore, more appropriate control for the installation environment of the device 30 to be controlled may be performed. Further, the control for further exerting the function of the device 30 to be controlled may be performed.

When the program is generated by the management server 10 as described above, the program may be generated using artificial intelligence (AI).

After the program is generated by the management server 10, the program is transmitted to the image forming device 200 to allow the image forming device 200 to control the device 30 to be controlled.

In this case, the management server 10 generates the program and the image forming device 200 controls the device 30 to be controlled so that as compared with the case where only the management server 10 generates the program and controls the device 30 to be controlled, the load of each for the management server 10 and the image forming device 200 is reduced.

The switching from the image forming device 200 to the management server 10 may be performed when the operating algorithm is reviewed, regardless of installation of a new device 30 to be controlled.

Specifically, for example, when the user or the like instructs to review the operating algorithm through the UI 206 (see FIG. 2), etc. of the image forming device 200, the switching from the image forming device 200 to the management server 10 is performed. In this case, the management server 10 generates a program in which an operating algorithm more suitable for the control of the device 30 to be controlled is reflected while controlling the device 30 to be controlled, similarly to the above-description.

When a new program is generated similarly to the above-description, the program is transmitted to the image forming device 200 to allow the image forming device 200 to control the device 30 to be controlled.

The switching from the image forming device 200 to the management server 10 may be performed when a know-how for the operation of the device 30 to be controlled is accumulated in another system and the know-how is reflected to the program.

Specifically, when the management server 10 also controls the device 30 to be controlled in another office room or a server which is different from the management server 10 controls the device 30 to be controlled similarly to the exemplary embodiment, the know-how (information) for the control of the device 30 to be controlled is accumulated in these servers.

In this case, when the accumulated information is utilized, more appropriate control for the device 30 to be controlled in the office room according to the exemplary embodiment may be performed.

When information (know-how) on the operation of the device 30 to be controlled is accumulated in the management server 10 or another server, the management server 10 according to the exemplary embodiment obtains the information and newly generates the program used to control the device 30 to be controlled based on the information.

Thereafter, the management server 10 controls the device 30 to be controlled using the new program. Further, as described above, the program is transmitted to the image forming device 200 to allow the image forming device 200 to control the device 30 to be controlled.

The switching from the image forming device 200 to the management server 10 may be performed when the management server 10 which stops due to the maintenance or the like returns.

The switching from the image forming device 200 to the management server 10 may be performed when the image forming device 200 enters in a power saving state or the power of the image forming device 200 is turned off. In other words, the switching from the image forming device 200 to the management server 10 may be performed when the image forming device 200 loses control of the device 30 to be controlled.

The switching from the image forming device 200 to the management server 10 may be performed when a value obtained by the image forming device 200 sharply changes.

Specifically, in the exemplary embodiment, the image forming device 200 obtains an output from the sensor 50 or the device 30 to be controlled, but when an output value exceeds a predetermined threshold value (sharply changes), the switching from the image forming device 200 to the management server 10 may be performed.

In other words, when the output value sharply changes and it is difficult to respond to the sharp change by the control of the image forming device 200, the switching from the image forming device 200 to the management server 10 may be performed.

The switching from the image forming device 200 to the management server 10 may be performed when the device 30 to be controlled is not a predetermined device 30 to be controlled.

In other words, the switching from the image forming device 200 to the management server 10 may be performed when a program for the control of the device 30 to be controlled is not stored in the image forming device 200 and the image forming device 200 cannot perform control.

As the device 30 to be controlled, various devices are assumed and a device 30 to be controlled which cannot be controlled by the image forming device 200 is also assumed. In this case, by switching the image forming device 200 to the management server 10, a possibility that the device 30 to be controlled is controlled is increased.

FIGS. 6A, 6B, 7A, 7B, 8A and 8B are flowcharts illustrating a specific example of processing performed in the office environment management system 1 of the exemplary embodiment.

In the above description, even though an aspect in which the device 30 to be controlled and the sensor 50 are separately provided has been described, there may be an aspect in which the sensor 50 is provided in the device 30 to be controlled. In the following description, an aspect in which the sensor 50 is provided in the office room and the sensor 50 is also provided in the device 30 to be controlled will be described.

Hereinafter, in some cases, a sensor 50 which is provided in the office room is referred to as an in-office room sensor 50 and a sensor 50 which is provided in the device 30 to be controlled is referred to as an in-device sensor 50.

Figure 6A:
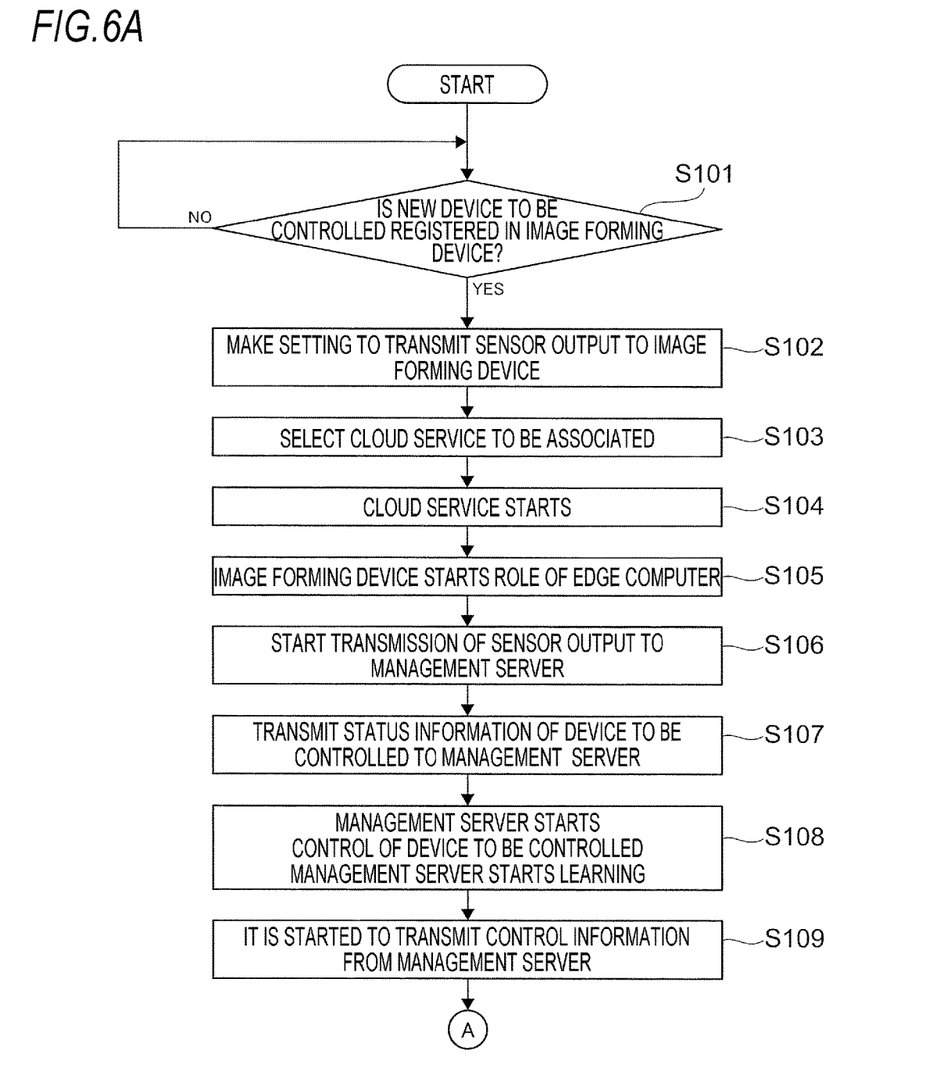
FIG. 6A is a flowchart illustrating a specific example of a process performed in the office environment management system.
Figure 6B:
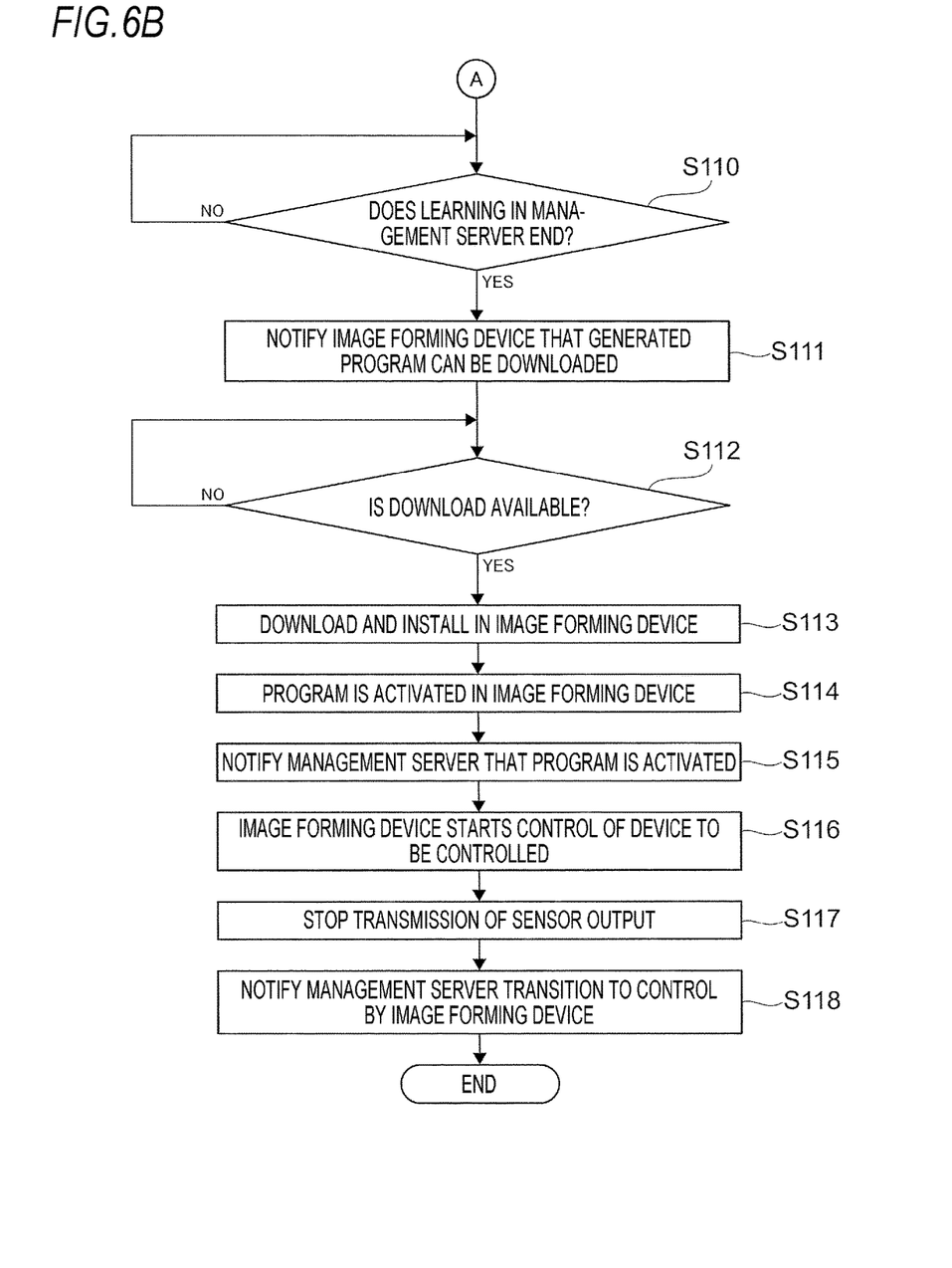
FIG. 6B is a flowchart illustrating a specific example of a process performed in the office environment management system.

In processing example illustrated in FIGS. 6A and 6B, first, the controller 222 (see FIG. 3) of the image forming device 200 determines whether a new device 30 to be controlled is registered in the image forming device 200 (step 101).

The registration of the device 30 to be controlled is performed by manipulating the UI 206 (see FIG. 2) of the image forming device 200 by the user and the controller 222 determines whether the new device 30 to be controlled is registered in the image forming device 200 based on the manipulation on the UI 206 performed by the user (based on information input by the user through the UI 206).

When the new device 30 to be controlled is registered in the image forming device 200, the user manipulates the device 30 to be controlled and the image forming device 200 and makes setting to transmit the output from the in-device sensor 50 to the image forming device 200 (step 102).

Further, the user selects a cloud service to be associated with the device 30 to be controlled (step 103).

In the exemplary embodiment, as described above, the cloud service related to the environment management of the office is provided by the management server 10 and the user, for example, selects a cloud service related to the environment management of this office.

Therefore, the device 30 to be controlled is under the control of the management server 10. In other words, the cloud service by the management server 10 starts (step 104).

In this cloud service, the image forming device 200 starts a role of an edge computer (step 105) and the image forming device 200 starts a process of transmitting an output from the in-office room sensor 50 to the management server 10 (cloud service) (step 106).

The image forming device 200 transmits status information of the device 30 to be controlled (a new device 30 to be controlled registered in step 101) which is a control target to the management server 10 (step 107). Specifically, the image forming device 200 transmits the output of the in-device sensor 50 to the management server 10.

Subsequently, the management server 10 starts the control of the device 30 to be controlled, and the management server 10 starts learning (step 108).

When the management server 10 starts the control of the device 30 to be controlled, it is started to transmit the control information from the management server 10 to the device 30 to be controlled (step 109).

Thereafter, the management server 10 determines whether the learning started in step 108 has ended (step 110). In other words, the management server 10 determines whether information required to generate a program (a program for controlling the device 30 to be controlled) has been collected.

When it is determined that the learning has ended, the management server 10 generates the program for controlling the device 30 to be controlled. The management server 10 notifies the image forming device 200 that the program can be downloaded (step 111).

Subsequently, when there is a reply from the image forming device 200, the management server 10 determines whether the program can be downloaded to the image forming device 200 based on the contents of the reply (step 112). When the management server 10 determines that the program can be download, the program is downloaded from the management server 10 to the image forming device 200 and the program is installed in the image forming device 200 (step 113).

Subsequently, the program is activated in the image forming device 200 (step 114) and then the image forming device 200 notifies the management server 10 that the program is activated in the image forming device 200 (step 115). The image forming device 200 starts the control of the device 30 to be controlled using the program (step 116).

Thereafter, transmission of a sensor output from the image forming device 200 to the management server 10 stops (step 117). Specifically, transmission of the output from the in-device sensor 50 to the management server 10 stops and transmission of the output from the in-office room sensor 50 to the management server 10 stops.

Thereafter, the image forming device 200 notifies the management server 10 that transition to the control by the image forming device 200 has been made (step 118).

Figure 7A:
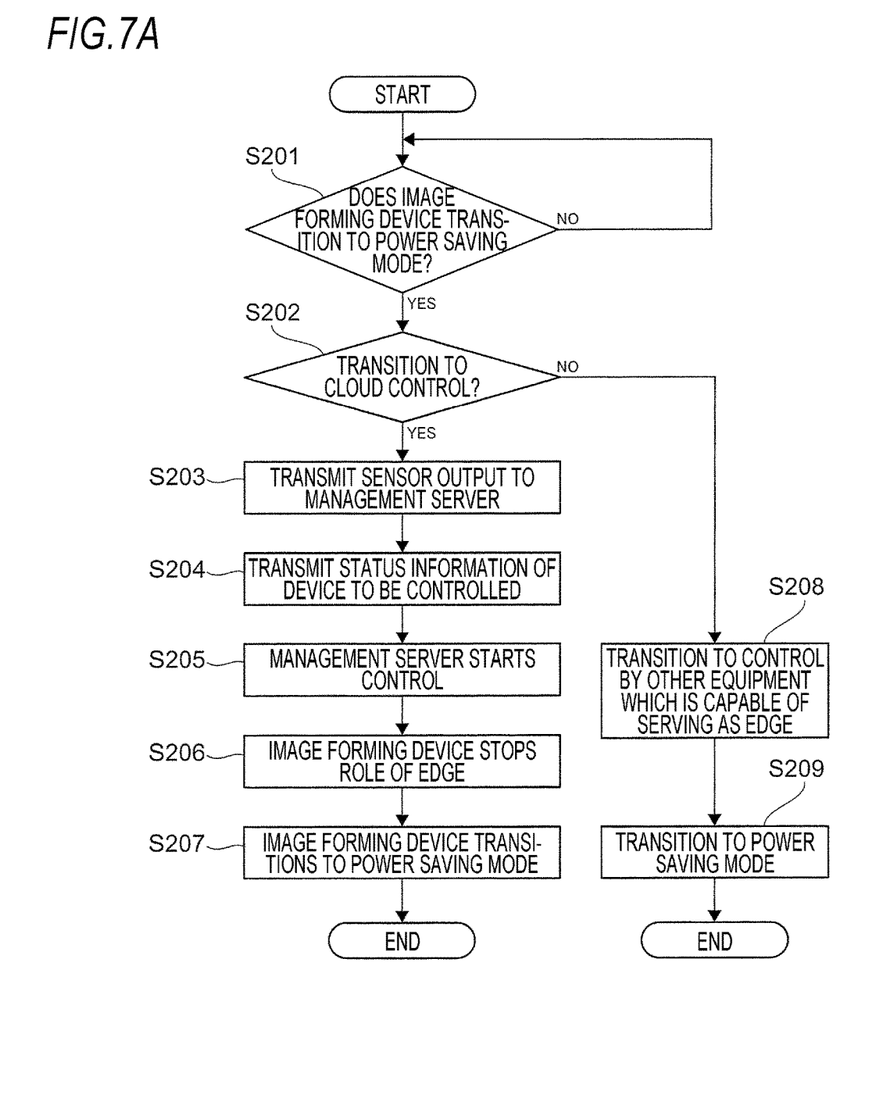
FIGS. 7A and 7B are flowcharts illustrating a specific example of a process performed in the office environment management system.
Figure 7B:
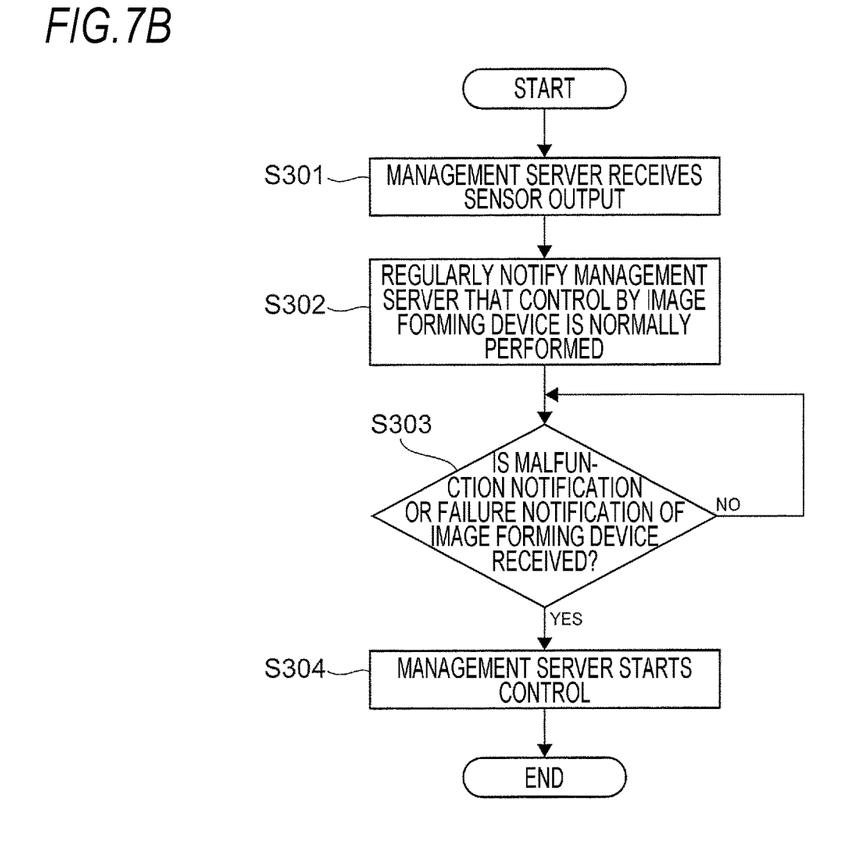

Referring to FIGS. 7A and 7B, another processing example will be described.

In the processing example illustrated in FIG. 7A, first, the image forming device 200 determines whether the image forming device 200 transitions to a power saving mode (step 201). When it is determined that the image forming device 200 transitions to the power saving mode, it is determined whether transition to cloud control (control by the management server 10) is made (step 202).

When it is determined that transition to the cloud control is not made in step 202, the control transitions to another device (a device other than the management server 10, such as another image forming device 200) (another device serving as an edge computer) which may control the device 30 to be controlled (step 208). Subsequently, the image forming device 200 transitions to a power saving mode (step 209).

In the meantime, in step 202, when it is determined that transition to the cloud control is made, the output from the in-office room sensor 50 is transmitted to the management server 10 (step 203).

Status information of the device 30 to be controlled is transmitted to the management server 10 (step 204). Specifically, the output from the in-device sensor 50 is transmitted to the management server 10.

Thereafter, the management server 10 (cloud service) starts the control of the device 30 to be controlled (step 205). Subsequently, the image forming device 200 stops the role of the edge computer (step 206). In other words, the image forming device 200 stops the control of the device 30 to be controlled. Thereafter, the image forming device 200 transitions to a power saving mode (step 207).

In the processing example, even though the image forming device 200 transitions to the power saving mode, the power is continuously supplied to functional units related to the transmission and reception of information, in the image forming device 200. Therefore, even after the image forming device 200 transitions to the power saving mode, the sensor output may be transmitted to the management server 10 via the image forming device 200. Further, even after the image forming device 200 transitions to the power saving mode, the control of the device 30 to be controlled by the management server 10 may be performed via the image forming device 200.

FIG. 7B is a view illustrating a flow of processing when the image forming device 200 does not work.

In the processing example, in a normal state, the management server 10 receives the sensor output (output from the in-office room sensor 50 and the in-device sensor 50) (step 301). In addition, even though the image forming device 200 is controlling the device 30 to be controlled, the management server 10 receives the output from the in-office room sensor 50 (status information in the office room) and the output from the in-device sensor 50 (status information of the device 30 to be controlled).

In the processing example, normally, the image forming device 200 regularly notifies the management server 10 (cloud service) that the control by the image forming device 200 is normally performed (step 302).

The management server 10 always determines whether malfunction notification or failure notification has been received from the image forming device 200 (step 303). Further, in the processing example, when the management server 10 receives the malfunction notification or the failure notification, the management server 10 starts the control of the device 30 to be controlled (step 304).

In the processing example, plural image forming devices 200 are provided in the office room and the in-office room sensor 50 and the device 30 to be controlled are connected not only to one image forming device 200, but to also the plural image forming devices 200. Further, the plural image forming devices 200 are connected to the management server 10.

That is, the in-office room sensor 50 and the device 30 to be controlled are connected to the management server 10 via the plural image forming devices 200.

In the processing example, when the image forming device 200 which controls the device 30 to be controlled does not work, the sensor output is transmitted to the management server 10 via other image forming devices 200 than the image forming device 200 which does not work.

The control information from the management server 10 is transmitted to the device 30 to be controlled via the other image forming devices 200.

Another processing example will be described with reference to FIG. 8.

In the image forming device 200, first, it is determined whether the image forming device 200 returns from the power saving mode (step 401).

Figure 8A:
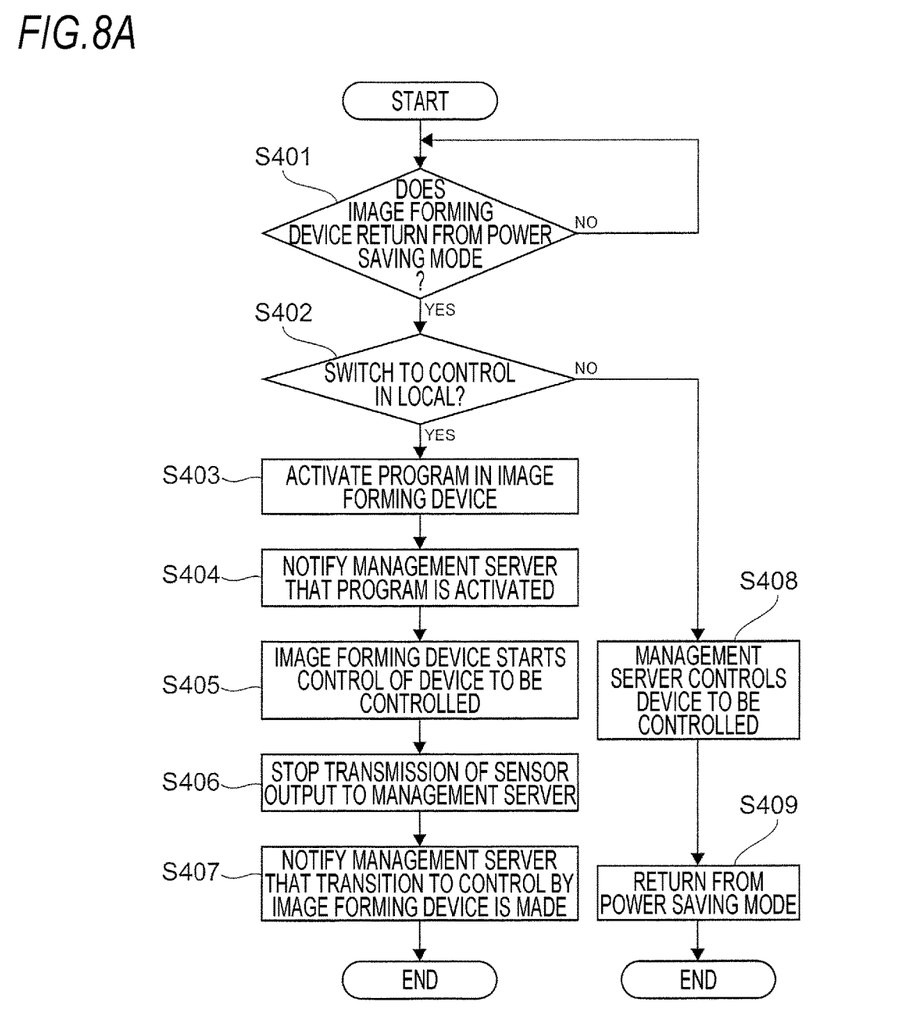
FIGS. 8A and 8B are flowcharts illustrating a specific example of a process performed in the office environment management system.

In other words, in the processing illustrated in FIG. 8A, when the processing starts, the image forming device 200 is in the power saving mode and the management server 10 controls the device 30 to be controlled. When a predetermined condition is satisfied, for example, when a power saving return button (not illustrated) provided in the image forming device 200 is pressed by the user, the image forming device 200 determines whether the image forming device 200 returns from the power saving mode.

When it is determined that the image forming device 200 returns from the power saving mode, for example, the image forming device 200 determines whether transition to the control in the local (control by the image forming device 200) is made (step 402).

In step 402, when it is determined that transition to the control in the local is not made, the management server 10 subsequently controls the device 30 to be controlled (step 408). Thereafter, the image forming device 200 returns from the power saving mode (step 409).

In the meantime, when it is determined that transition to the control in the local is made in step 402, in the image forming device 200, a program for controlling the device 30 to be controlled is activated (step 403). Subsequently, the image forming device 200 notifies the management server 10 that the program is activated in the image forming device 200 (step 404). Thereafter, the image forming device 200 starts the control of the device 30 to be controlled using the program (step 405).

Subsequently, transmission of a sensor output from the image forming device 200 to the management server 10 stops (step 406). Thereafter, the image forming device 200 notifies the management server 10 that the transition to the control by the image forming device 200 has been made (step 407).

Figure 8B:
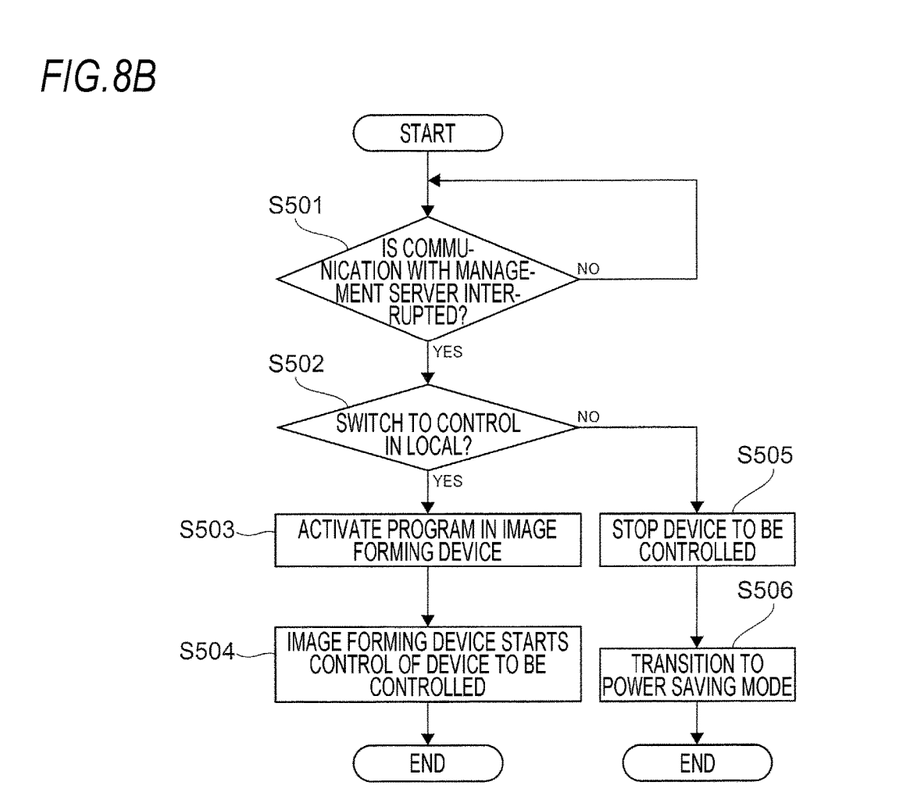

FIG. 8B is a view illustrating a flow of processing when the communication between the management server 10 and the device 30 to be controlled is unable. In the processing example, in the normal status, the management server 10 controls the device 30 to be controlled via the image forming device 200.

In this processing example, the image forming device 200 monitors the communication with the management server 10 (cloud service) and the image forming device 200 determines whether the communication with the management server 10 is interrupted (step 501).

In step 501, when it is determined that the communication with the management server 10 is interrupted, the image forming device 200 determines whether switching to the control in the local is made (step 502). In other words, it is determined whether transition to the control by the image forming device 200 is made.

When it is determined that the transition to the control in the local is made in step 502, in the image forming device 200, a program for controlling the device 30 to be controlled is activated (step 503). Thereafter, the image forming device 200 starts the control of the device 30 to be controlled using the program (step 504).

In the meantime, in step 502, when it is determined that the transition to the control in the local is not made, the image forming device 200 transmits predetermined control information (control signal) to the device 30 to be controlled and stops the device 30 to be controlled (step 505).

Thereafter, when a predetermined signal is not input to the image forming device 200, the image forming device 200 transitions to the power saving mode (step 506).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An equipment control system comprising:
    an equipment control device that controls equipment provided in an office room; and
    an external control device that is provided outside the office room and controls the equipment provided in the office room via the equipment control device, wherein:
    when a predetermined condition is satisfied, a control device that controls the equipment is switched from one of the equipment control device and the external control device to the other; and
    when a new equipment is registered in the office room while the control device is the equipment control device, the control device is automatically switched to the external control device.

2. The equipment control system according to claim 1, wherein:
    a plurality of pieces of the equipment are provided in the office room;
    a portion of the plurality of pieces of equipment is controlled by the equipment control device; and
    the other portion of the plurality of pieces of equipment is controlled by the external control device.

3. The equipment control system according to claim 1, wherein:
    when the equipment control device loses control of the equipment, the control device that controls the equipment is switched from the equipment control device to the external control device; and
    when the external control device loses control of the equipment, the control device that controls the equipment is switched from the external control device to the equipment control device.

4. The equipment control system according to claim 3, wherein
    when the equipment control device enters in a power saving state or a power off state, the control device that controls the equipment is switched from the equipment control device to the external control device.

5. The equipment control system according to claim 1, wherein when the equipment control device returns from a power saving state or is switched from a power off state to a power on state, the control device that controls the equipment is switched from the external control device to the equipment control device.

6. The equipment control system according to claim 1, wherein when communication between the equipment control device and the external control device is unable or when a communication state between the equipment control device and the external control device is in a predetermined communication state, the control device that controls the equipment is switched from the external control device to the equipment control device.

7. The equipment control system according to claim 1, wherein when a state in which the equipment control device loses control of the equipment is changed to a state in which the equipment control device can control the equipment, the control device that controls the equipment is switched from the external control device to the equipment control device.

8. The equipment control system according to claim 7, wherein when a state in which a program for controlling the equipment is not stored in the equipment control device is changed to a state in which the program is stored in the equipment control device, the control device that controls the equipment is switched from the external control device to the equipment control device.

9. The equipment control system according to claim 1, wherein:

the equipment control device is provided in the office room; and the equipment control device is configured with an image forming device that forms an image on a recording medium.

10. The equipment control system according to claim 1, wherein the predetermined condition is that a predetermined time is reached.

11. An image forming device comprising:

a controller that controls equipment provided in an office room;

a transceiver that receives control information from a control device that controls the equipment and transmits the control information to the equipment; and an image forming unit that forms an image on a recording medium, wherein:

when a predetermined condition is satisfied, instead of the control device, the image forming device transmits the control information to the equipment to control the equipment; and when a new equipment is registered in the office room while the image forming device controls the equipment, control of the equipment is automatically switched from the image forming device to the control device.

12. A non-transitory computer readable storage medium storing a program causing a computer installed in an image forming device including a transceiver that receives control information from a control device that controls equipment and that transmits the control information to the equipment, to execute a process comprising:

when a predetermined condition is satisfied, instead of the control device, controlling the equipment; and when a new equipment is registered in the office room while the image forming device controls the equipment, automatically switching control of the equipment from the image forming device to the control device.

* * * * *